United States Patent [19]
Rowe et al.

[11] Patent Number: 5,908,458
[45] Date of Patent: Jun. 1, 1999

[54] AUTOMATED SYSTEM AND METHOD FOR CONTROL OF MOVEMENT USING PARAMETERIZED SCRIPTS

[75] Inventors: Patrick S. Rowe; Anthony J. Stentz, both of Pittsburgh, Pa.

[73] Assignee: Carnegie Mellon Technical Transfer, Pittsburgh, Pa.

[21] Appl. No.: 08/796,824

[22] Filed: Feb. 6, 1997

[51] Int. Cl.[6] .................................................. B05B 9/06
[52] U.S. Cl. ........................................................... 701/50
[58] Field of Search ............................ 701/50, 1, 2, 23, 701/24, 25, 27; 172/2, 3, 4.5, 10; 395/86, 95, 82, 85, 99; 901/6, 2, 4, 41, 42; 318/568.1, 568.11, 568.16, 568.21; 364/189, 190, 191, 193; 37/348, 414; 340/685, 686; 414/699, 730, 633

[56] References Cited

U.S. PATENT DOCUMENTS

| | | | |
|---|---|---|---|
| 3,819,922 | 6/1974 | Horn et al. | 701/50 |
| 4,578,562 | 3/1986 | Lindstrom et al. | 395/82 |
| 4,833,615 | 5/1989 | Bitner et al. | 701/124 |
| 5,019,761 | 5/1991 | Kraft | 701/50 |
| 5,065,326 | 11/1991 | Sahm | 364/424.07 |
| 5,086,400 | 2/1992 | Hayati et al. | 395/95 |
| 5,109,340 | 4/1992 | Kanayama | 364/424.02 |
| 5,224,033 | 6/1993 | Nakamura et al. | 701/50 |
| 5,257,177 | 10/1993 | Bach et al. | 701/50 |
| 5,274,557 | 12/1993 | Moriya et al. | 364/424.07 |
| 5,424,623 | 6/1995 | Allen et al. | 318/568.18 |
| 5,517,419 | 5/1996 | Lanckton et al. | 701/216 |
| 5,535,532 | 7/1996 | Fujii et al. | 37/348 |
| 5,699,247 | 12/1997 | Moriya et al. | 701/50 |
| 5,735,066 | 4/1998 | Tochizawa et al. | 701/50 |
| 5,735,352 | 4/1998 | Henderson et al. | 701/50 |
| 5,794,369 | 8/1998 | Lee et al. | 701/50 |
| 5,809,440 | 9/1998 | Beck et al. | 701/50 |

FOREIGN PATENT DOCUMENTS

| | | | |
|---|---|---|---|
| 1203605 | 4/1986 | Canada | 342/22.1 |

OTHER PUBLICATIONS

Craig, Introduction to Robotics Mechanics & Control; 1986; pp.2–5, 64,65,281–300.

Charniak et al. Introduction to Artificial Intelligence; 1985;pp. 484–543.

Brady et al. Robot Motion: Planning and Control; 1982; pp. 473–566.

*Primary Examiner*—Jacques H. Louis-Jacques
*Attorney, Agent, or Firm*—Kevin M. Kercher

[57] ABSTRACT

Robotic machines, such as mobile manipulators, are controlled by a relatively high-level script while changes in the environment are accommodated by including parameters in the script. Sensors, manual inputs, and other software can be used as sources of data for setting the values of the parameters. The high-level script includes sets of instructions with each set defining movement of one portion of the robotic machine, such as a joint of the manipulator. The several sets of instructions are executed concurrently in a primary script. One or more secondary scripts, each containing concurrently executed sets of instructions may be executed when an abnormal condition is detected. The movements performed by the robotic machine are generally defined by the instructions, but precisely how the movements are performed is determined by the values of the parameters. By using parameterized scripts, it is unnecessary to compute and track trajectories.

21 Claims, 6 Drawing Sheets

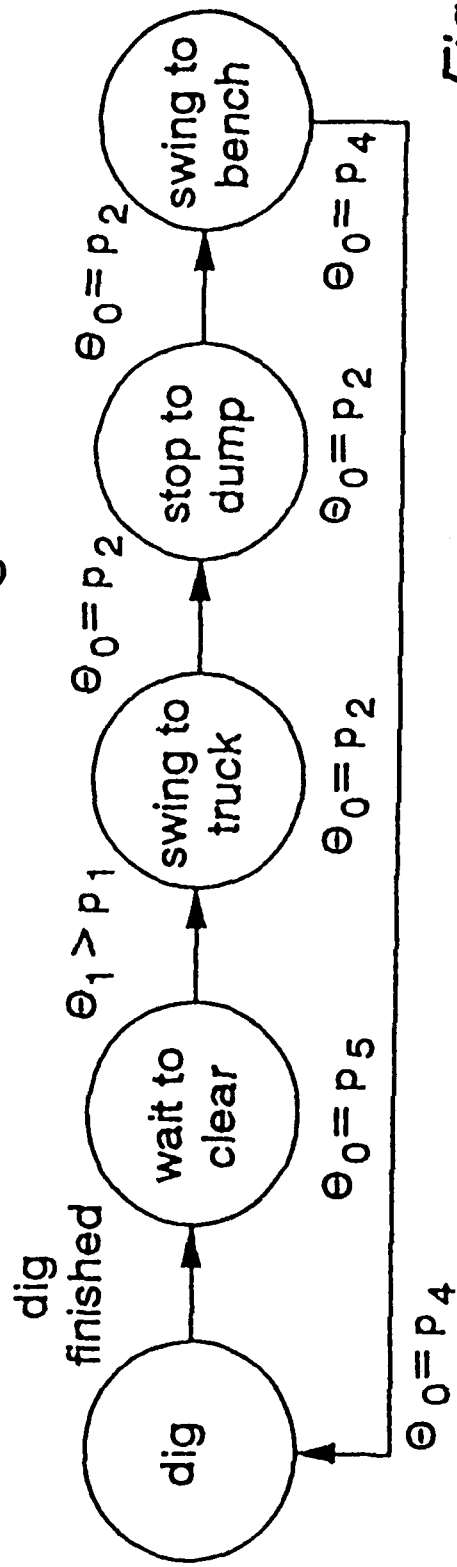
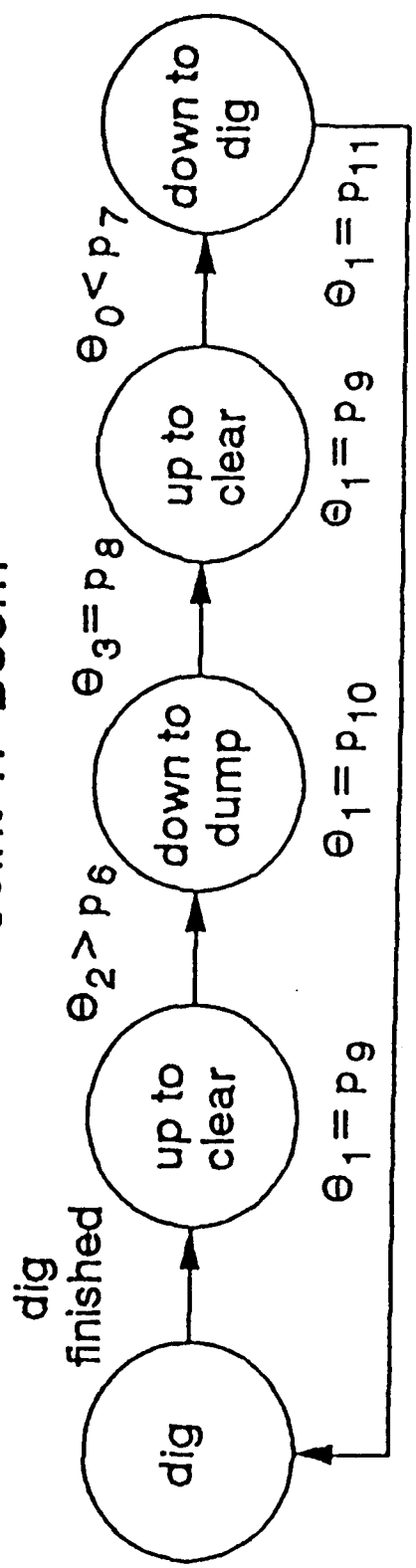
Fig. 4A
Fig. 4B

AUTOMATED SYSTEM AND METHOD FOR CONTROL OF MOVEMENT USING PARAMETERIZED SCRIPTS

FIELD OF THE INVENTION

This invention relates generally to a system and method for automatically controlling movement of an apparatus, and more particularly to a control system for automated movement of material from a specific location within a first general area to a specific location in a second general area, such as operations performed by an autonomous excavator loading a truck.

DESCRIPTION OF THE RELATED ART

Robotic machines become increasingly more complicated as they become able to perform more challenging tasks. For example, a class of robots known as mobile manipulators, consisting of a multi-link manipulator mounted on a mobile base, typically have 6 or more degrees of freedom. Such robots are capable of performing many different tasks, such as autonomous exploration, inspection, mining, construction and excavation. The wide-ranging capabilities of such robots comes at a price. Due to the very nature of the freedom of movement of such robots within three-dimensional space, it is difficult to find an optimal path in real time. Generation of commands to move the mobile manipulator along the optimal path requires knowledge of the dynamic characteristics for each axis of movement, in particular the velocity and acceleration limits of each degree of freedom. Solving for an optimal path is made more difficult when the payload varies considerably and its mass is not insignificant, as in the case of excavators and other autonomous machines moving material that is not a small fraction of the mass of the manipulator. Generation of commands for efficient movement of hydraulic manipulators, compared to electric manipulators, is further complicated by higher lag times and the common use of a single hydraulic pump for two or more actuators.

Conventional robotic systems often use memorization of manual operations to learn the movements required for an operation. Some systems, like the automatic excavation control system disclosed in U.S. Pat. No. 5,065,326, issued to William C. Sahm on Nov. 12, 1991, include the ability to specify limits of operation, such as excavation depth and slope and to define a restricted area, so that the operation can be performed within the set limits. Other systems, such as the work machine disclosed in U.S. Pat. No. 5,274,557, issued to Yukio Moriya et al on Dec. 28, 1993, take into account changes in load by maintaining other control values, such as pump discharge and flow supplied to hydraulic actuators. However, none of these known methods for operating robotic systems is sufficiently flexible to safely permit free movement of a mobile manipulator in three-dimensional space while permitting adaptation to changing conditions.

A different method of controlling complex movements of a robot is disclosed in U.S. Pat. No. 5,086,400 issued to Samad A. Hayati and Subramanian Venkataraman on Feb. 4, 1992, which is directed to a robot used in operations in outer space. The robot is designed for remote operation from earth, but due to the time delay between sensing conditions and receiving instructions to respond to those conditions, tasks are automated for operation while awaiting further instructions. A general purpose robot library called RCCL provides functions, such as a trajectory generator, to control the robot. However, the user of a library like RCCL must provide higher level code which coordinates the function calls to the robot. In U.S. Pat. No. 5,086,400 RCCL was used to process the sensor inputs to provide data to a conventionally programmed robot which has a manual override for instructions from Earth. RCCL could similarly be used by a program which operates according to the present invention.

SUMMARY OF THE INVENTION

An object of the invention is to provide a way to simplify motion planning of robots.

Another object of the present invention is to eliminate complicated robot control algorithms for trajectory tracking.

A further object of the present invention is to provide a way to encapsulate high level expert human knowledge and heuristics about the procedure of a given task performed by a robot, while still being able to respond to changes in environmental variables by modifying details of the procedure.

The above objects are attained by providing a method of controlling complex automated movement, comprising executing pre-stored instructions, including at least one parameter, generally defining the complex automated movement; and determining a value for each parameter during the executing of the pre-stored instructions. Parameters are used as needed to define changes in the complex automated movement as a result of work that is done or changes in the environment. For example, complex automated movement performed by a mobile manipulator can be affected by the location, as well as the orientation of the mobile platform on which the mobile manipulator is mounted, and by movement of objects around the mobile manipulator, such as people or machines. In addition, when the mobile manipulator is performing work which involves moving something from one location to another, either the starting position or the destination may change, requiring changes in the movement. Sensors mounted on the mobile manipulator can be used to detect the starting and ending locations and the parameters in the instructions can be modified to maximize the efficiency of the complex automated movement, despite changes in the movement that is performed.

A specific example of a mobile manipulator is an excavator moving soil, stones, or other material from one location to another location, such as from a pile to a dump truck. As the material is moved from the pile or trench, the starting point of movement of the arm of the excavator at the conclusion of digging will change. In addition, the trucks may vary in size, precise position, orientation relative to the excavator, etc. All such changes should be taken into account to maximize efficiency in transferring the material from the starting location to the truck with minimal spillage. Parameters can be included in instructions, e.g., to determine when to begin movement of different parts of the excavator arm to obtain quick, efficient movement of the arm from when the material has been loaded until the material is deposited in the truck. Preferably, modeling information, such as real time modeling software, is used to determine the limits on speed and acceleration of each part of the excavator arm to better coordinate the motion of the different joints of the arm.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 4a is a block diagram of a truck loading script according to the present invention;

FIG. 4b is another block diagram of a truck loading script according to the present invention;

DESCRIPTION OF THE PREFERRED EMBODIMENTS

While the present invention can be applied to many different types of automated devices, many of which are often referred to as robots, the present invention is particularly helpful in controlling the operation of mobile manipulators due to the large number of degrees of freedom of such devices. The disclosure below describes an embodiment of the present invention used for control of an excavating machine having a hydraulic arm. How the present invention is used to overcome the problems which arise in controlling such a device will be described. However, the present invention can be applied to other autonomous machines or robots, whether mobile or stationary.

Figure 1:
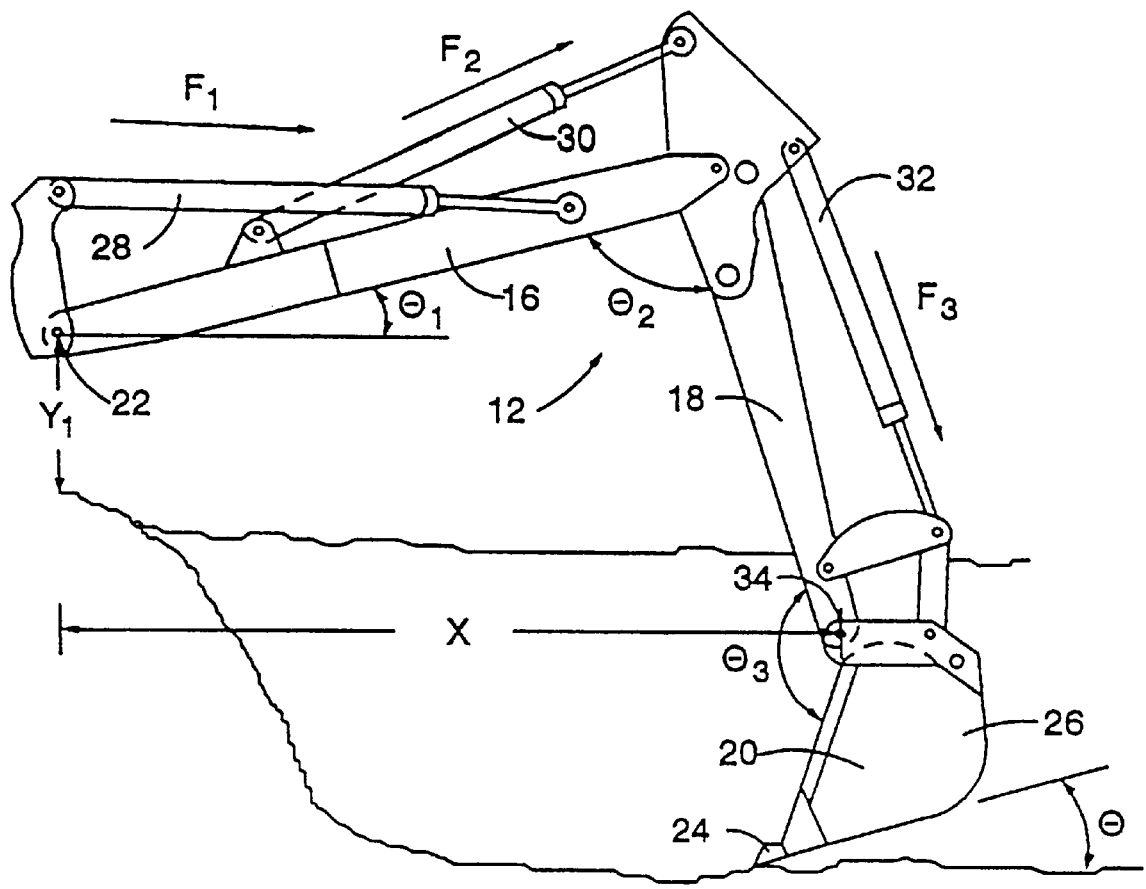
FIG. 1 is a fragmentary side view of an excavating machine.
Figure 3:
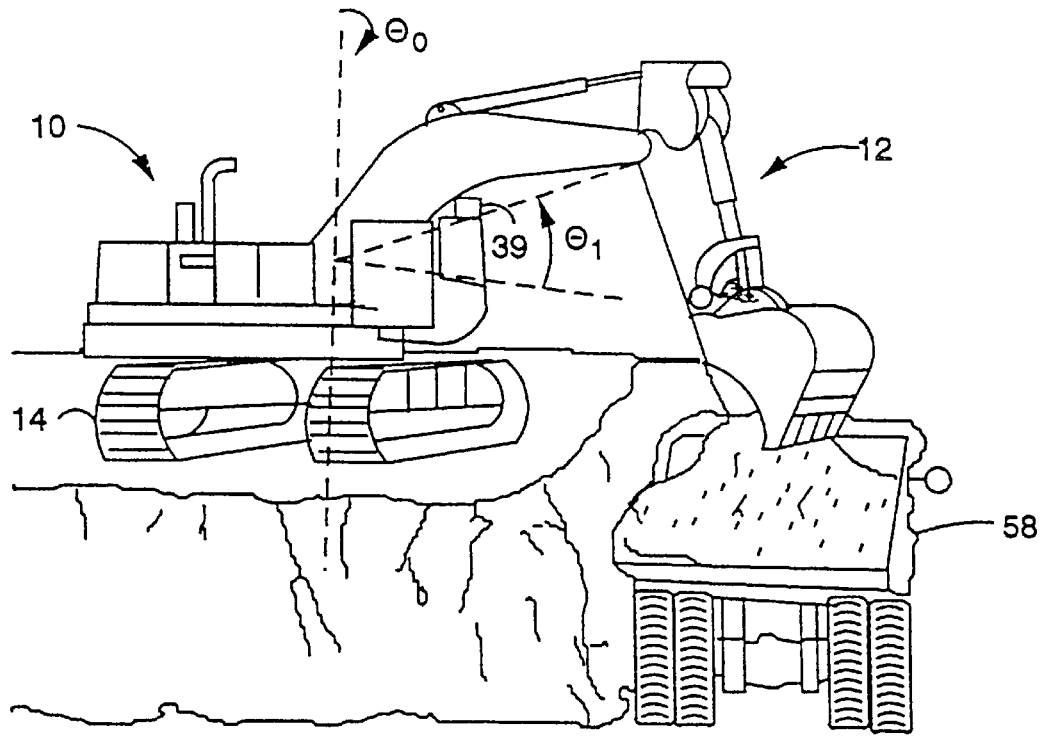
FIG. 3 is a perspective drawing of an excavator loading a truck.
Figure 4C:
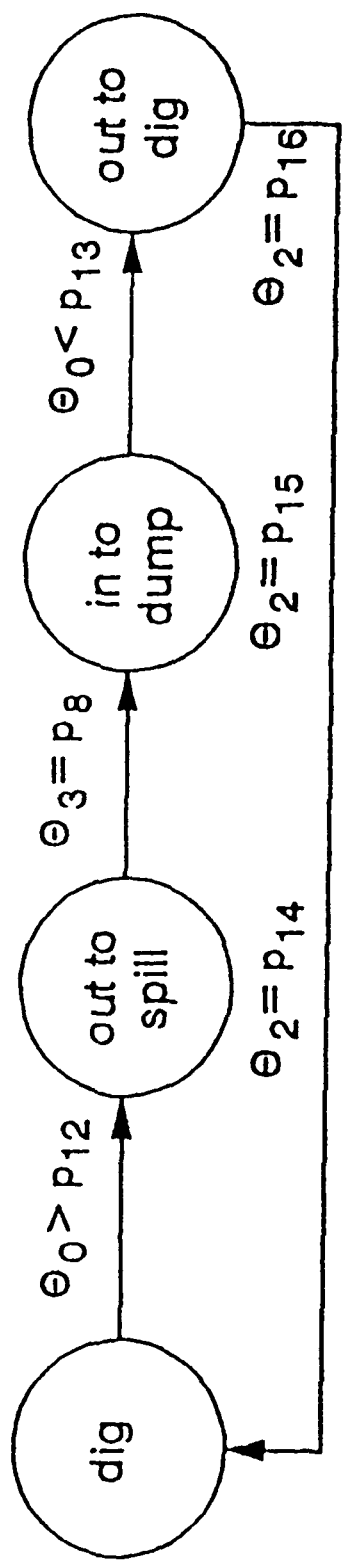
FIG. 4c is another block diagram of a truck loading script according to the present invention.
Figure 4D:
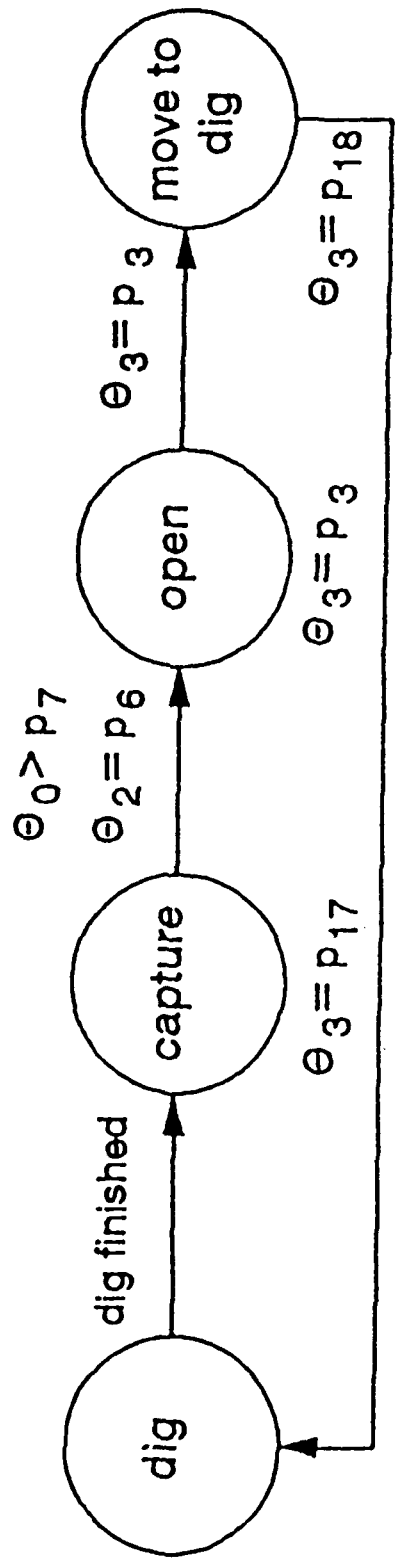
FIG. 4d is another block diagram of a truck loading script according to the present invention.

A typical excavating machine 10 as an example of a mobile manipulator to which the present invention can be applied is illustrated in FIG. 3 and details of a manipulator arm or work implement 12 are illustrated in FIG. 1. In a conventional fashion, the work implement 12 is mounted on a mobile platform 14. The manipulator arm or work implement 12 has four degrees of freedom, and the tracked mobile platform 14 (FIG. 3) provides two additional degrees of freedom. Such an excavator is used for mass excavation to move large amounts of earth into trucks which haul the earth away. Manual operation of such excavators proceeds very rapidly with good excavator operators loading several hundred trucks per day.

The work implement 12 includes a boom 16, stick 18 and bucket 20. The boom 16 is typically mounted on the mobile platform 14 by means of a boom pivot pin 22. The stick 18 is pivotally connected to the end of the boom 16, and the bucket 20 is pivotally attached to the stick 18. The bucket 20 includes a rounded portion 26 and bucket teeth 24.

The boom 16, stick 18 and bucket 20 are independently and controllably actuated by linearly extendable hydraulic cylinders. The boom 16 can be swiveled by a hydraulic motor (not shown) which rotates the manipulator arm 12 above the tracked platform 14. The boom 16 is actuated by at least one boom hydraulic cylinder 28 for upward and downward movement of the bucket 20. The stick 18 is actuated by at least one stick hydraulic cylinder 30 for longitudinal horizontal movements of the bucket 20. The bucket 20 is actuated by a bucket hydraulic cylinder 32 as a radial range of motion about a bucket pivot pin 34. For purposes of illustration, only one boom and one stick hydraulic cylinder 28, 30 is shown in FIG. 1, but more than one hydraulic cylinder may be provided.

Movement of the work implement 12 illustrated in detail in FIG. 1 will be described. The work implement 12 illustrated in FIG. 3 has a slightly different construction, but is capable of the same movements. The boom 16 is raised by retracting the boom hydraulic cylinder(s) 28 and lowered by extending the same cylinder(s) 28. Retracting the stick hydraulic cylinders 30 moves the stick 18 away from the excavating machine 10 and extending the stick hydraulic cylinder(s) 30 moves the stick 18 toward the machine 10. Finally, the bucket 20 is rotated away from the excavating machine 10 when the bucket hydraulic cylinder 32 is retracted and rotated toward the machine 10 when the same cylinder 32 is extended.

Mass excavation is a good application for parameterized scripts. The excavator 10 repeatedly performs a series of movements which are very similar, but not quite the same. The earth to be removed is located in the same general area typically directly in front of the excavator 10. There are usually no obstacles in the excavator's work space, with the exception of the sides of the truck. The changes which must be taken into account by the parameters include variations in location, orientation and dimensions of each truck 58 to be loaded. The terrain of the earth that is being moved is obviously changing as it is excavated. The earth cannot always be dumped the same place in the truck bed, nor can it always be dug from the same location in the ground.

There may also be times when something must be done which may not be considered part of a "normal" truck loading procedure. For example, if the earth is loaded too high in the truck bed, it may need to be tamped down with the bucket 20 to avoid spilling over the sides of the truck 58. This is a special event, because it does not happen on each dig-dump cycle, rather only when the truck 58 is full, and it may not be needed in all cases, depending upon the ease with which the earth flows to fill the truck bed. In addition, safety is a major concern when dealing with such machines, so an autonomous excavator preferably is able to deal with obstacles which could get in the way of the manipulator or mobile base.

Design of a parameterized script for an apparatus like the mass excavator 10 begins with acquiring information on how the operations are currently performed manually. In the exemplary embodiment of mass excavation, expert human excavator operators were observed and asked how they would teach someone to load a truck. The sequence of steps performed by the human operators was the basis for the truck loading parameterized script described below. Other complex movements could be similarly automated by observing manual operations and writing instructions in a script to perform the general movements. Appropriate script parameters, which have values that will change during execution of the script, are determined during this design phase. As the script is tested, additional parameters may be added to refine the operation of the script.

The objectives of the truck loading script described below included the following. (1) Load a truck as optimally and efficiently as possible in normal working conditions. (2) Take into account hydraulic flow coupling and hydraulic system power limits. Hydraulic pumps can only deliver a finite amount of power and they usually power more than one joint, so it is preferable to initiate movement of only one coupled joint at a time. (3) Safely avoid all known obstacles in the work space, including the truck and unexcavated earth. (4) Minimize spillage of earth onto the ground around the truck during dumping.

Figure 2:
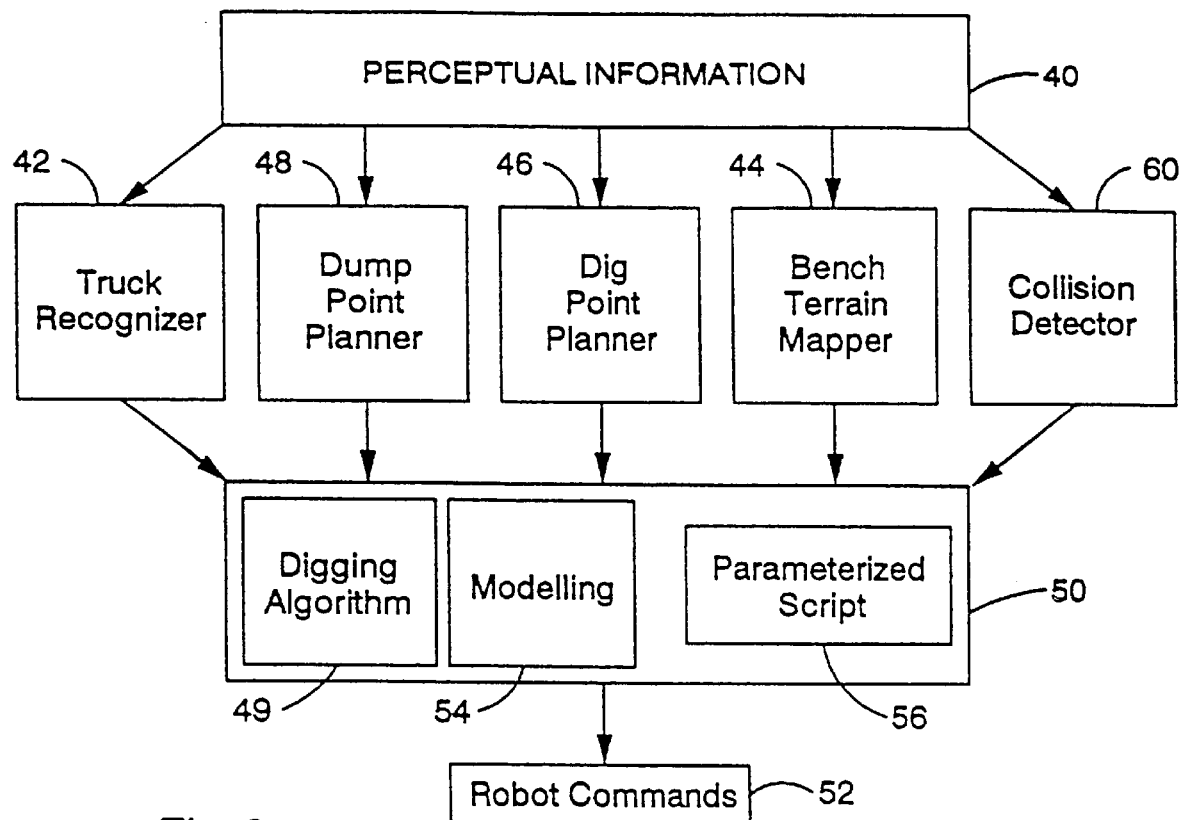
FIG. 2 is block diagram of software according to control operation of an excavating machine.

In general, parameterized scripts obtain information of the environment, define operational limitations of the device being controlled and contain instructions generally defining the movement to be automated. A block diagram illustrating these types of information for a truck loading parameterized script 56 is illustrated in FIG. 2. Sensors 39 (FIG. 3) provide perceptual information 40 to software, such as truck recognizer 42 and bench terrain mapper 44 which refine information regarding the environment in which the excavator 10 operates. The dig point planner 46 and dump point planner 48 may be provided by manual inputs or software. An example of digging algorithm software 49 which uses pressure feedback to load the bucket with soil is provided in U.S. Pat. No. 5,446,980 issued to David J. Rocke, on Sep. 5, 1995. The bench terrain mapper 44 may be obtained from previously stored data provided by surveying the area to be excavated, supplemented with sensors 39, such as radar or laser devices capable of detecting where earth remains to be excavated.

In general, the sensors 39 provide the perceptual information 40 to perceptual modules 42, 44, 46, 48. These modules receive the perceptual information 40 from, e.g., cameras or laser range finders, and perform analysis of the inputs from the sensors 39 to generate external parameters. For example, the truck recognizer 42 determines the location, orientation and measurements of a truck 58 to be loaded. The external parameters that the truck recognizer 42 sends to the truck loading software 50 are the coordinates of the four corners of the truck bed and the height of the walls of the truck 58.

The truck loading software 50 generates robot commands 52 that open and close the valves controlling the hydraulic cylinders 28, 30, 32. After the truck loading software 50 receives values for the external parameters, values of internal parameters may be determined using modeling information 54. The modeling information 54 may be provided by real time modeling software, or previously stored results of a model of the mobile machine, in this case excavator 10. A balance must be struck between the sophistication of the model, the speed with which the model executes and the storage space required for the modeling information 54. Whether real time modeling software or one or more look-up tables are used depends upon the type of modeling software available and the complexity of the operation being performed.

Two ways in which internal parameters can be computed are geometrically and dynamically. Geometric calculations use the geometry of the environment and the kinematics of the mobile manipulator to determine values for the parameters in the script 56. As an example, FIG. 3 shows the boom angle which is one of these parameters, used to define how to raise the bucket 20 safely above the truck 58 to avoid a collision when it moves over the truck 58. This computation requires knowledge about the dimensions and location of the truck 58 which it receives from the truck recognizer 42, and knowledge of the lengths of the links (boom 16, stick 18 and bucket 20). In addition, other internal parameters may also be required, such as other joint angles when the boom 16 moves closer to the truck 58. Some other internal script parameters computed in this way are the angles which will keep the soil captured in the bucket 20 while moving the bucket 20 to the truck 58, and thus produce minimal spillage.

Dynamic parameter calculations use knowledge of the velocities and accelerations of the manipulator's joints to predict how long it will take to move a particular joint from a start angle to a goal angle. Using this knowledge, joint movement commands may be coordinated to achieve optimal performance during execution of the instructions. For example, when the digging operation is completed, the machine 10 does not have to wait until the bucket 20 has raised to the clearance boom angle for swinging to the truck 58. Knowledge of the boom joint's velocity and acceleration limits and the swing joint's velocity and acceleration limits may be used to estimate the times it will take to raise the bucket 20 and to swing the bucket 20 to the truck 58.

If it will take longer to swing to the truck 58 than to raise the bucket 20, then the first command to be executed is a command to swing which is followed by a command to raise the bucket 20 in sufficient time to clear the side of the truck 58. On the other hand, if it takes longer to raise the bucket 20, the bucket 20 begins to be raised before swinging is commenced. Which command is issued first depends upon the distance from the end of digging to the side of the truck 58 closest to the bucket 20 and the height of the top of the truck 58. Thus, the values of the parameters will determine the order of execution of the instructions, as discussed in more detail below.

Dynamic knowledge preferably also takes into account system latencies. A typical excavator has significant delays (on the order of 0.5 seconds between when a joint command is issued and when the joint actually beings to move, primarily due to the time it takes to open the large hydraulic valves to allow hydraulic fluid to flow to the cylinders. By measuring and anticipating these delays, the joint commands can be issued at an appropriate time, so that the joint begins moving at the desired time. For example, it is preferable to open the bucket 20 while the bucket 20 is moving over the truck 58. By anticipating the bucket joint delay, the command to open the bucket 20 can be issued at the right point during movement of the manipulator arm 12, so that the bucket 20 begins to open while the manipulator arm 12 is still moving and the bucket 20 is over the truck 58.

FIGS. 4a through 4d are block diagrams of truck loading scripts with separate instructions for each of the joints, because each joint follows its own script. This permits the relationship between the joints to be represented by parameters which simplify generation of the script and provides greater flexibility. Alternatively, a single script can produce commands for more than one joint, where the joints are closely related, such as where a manipulator has a hand at the distal end with a multiple axis wrist and some sort of gripping mechanism. The commands controlling the wrist might be generated in a single script and the command to the gripper might be in the same script or a different script.

In FIGS. 4a through 4d each circle represents a script step. Directly below the circle is the command 52 which is sent to the machine 10 as an angle $\Theta$ for the joint, where the joint angles $\Theta_1$–$\Theta_{14}$ are illustrated in FIG. 1 and joint angle $\Theta_0$ is illustrated in FIG. 3. The parameters are determined from the inputs received externally from the script 56, or computed internally by modeling 54. The parameters $P_1$–$P_{18}$ are listed in the table below.

TABLE ONE

PARAMETERS.

| | |
|---|---|
| $P_1$ | boom angle to begin swing |
| $P_2$ | swing dump angle |
| $P_3$ | bucket dump angle |
| $P_4$ | swing dig angle |
| $P_5$ | current swing angle |
| $P_6$ | stick angle placing bucket over truck |
| $P_7$ | swing angle at truck rear |
| $P_8$ | bucket angle when mouth is vertical |
| $P_9$ | boom clearance angle |

TABLE ONE-continued

PARAMETERS.

| | |
|---|---|
| $P_{10}$ | boom dump angle |
| $P_{11}$ | boom dig angle |
| $P_{12}$ | swing angle to begin stick out |
| $P_{13}$ | swing angle to begin stick in |
| $P_{14}$ | stick start dump angle |
| $P_{15}$ | stick end dump angle |
| $P_{16}$ | stick dig angle |
| $P_{17}$ | bucket capture angle |
| $P_{18}$ | bucket dig angle |

In the truck loading script illustrated in FIGS. 4a through 4d, all step transitions are event based, rather than time based. This provides a safety factor in that if something should go wrong in one of the joints, then all of the joint scripts will stop. An event in each joint that has stopped will not occur and will not trigger transition to the next state in the other joints. Thus, the excavator 10 will come to a stop. In addition to the primary script 56 illustrated in FIGS. 4a through 4d, secondary scripts may be included to perform a series of movements in response to detection of specific conditions. Some examples are collision avoidance, tamping soil in a truck, cleaning up soil that spilled around the loading area, and removing boulders that could impede digging, but are not to be loaded into a truck. A secondary script for collision avoidance is described below.

A collision detector 60 is shown in FIG. 2 as a perceptual routine receiving inputs from the sensors 39 and supplying external parameters to the script 50. The sensor(s) 39 which supply external parameters to the collision detector 60 may be the same as used by the truck recognizer module 42, or may be similar types of sensors mounted on the manipulator arm 12. Within the primary script 56, an instruction is included to check the external parameter(s) output by the collision detector 60. When the test indicates that an obstacle is in the path of the manipulator arm 12, the joint scripts illustrated in FIGS. 4a through 4d are interrupted and a secondary script is executed to move the manipulator arm 12 around the obstacle. At the conclusion of the secondary script, the current position of each of the joints are supplied to the joint scripts and the joint scripts resume execution. Other secondary scripts can be executed in a similar manner, e.g., when the truck recognizer 42, or other "vision" software detects conditions requiring tamping of the soil in the truck 58, the joint scripts illustrated in FIGS. 4a through 4d are interrupted and a secondary script for tamping is performed.

Field tests of the script illustrated in FIGS. 4a through 4d were performed using a 25 ton hydraulic excavator similar to that illustrated in FIG. 1. Resolvers, such as resolver part no. 11-BHM-20AAG, from Litton, Murphy, N.C., were mounted at each joint to measure joint angles. Control signals for the excavator's manipulator arm 12 were provided by a low level proportional-derivative joint position controller. In the tests, the tracks were not activated. A 15 ton dump truck was used for loading.

Figure 5A:
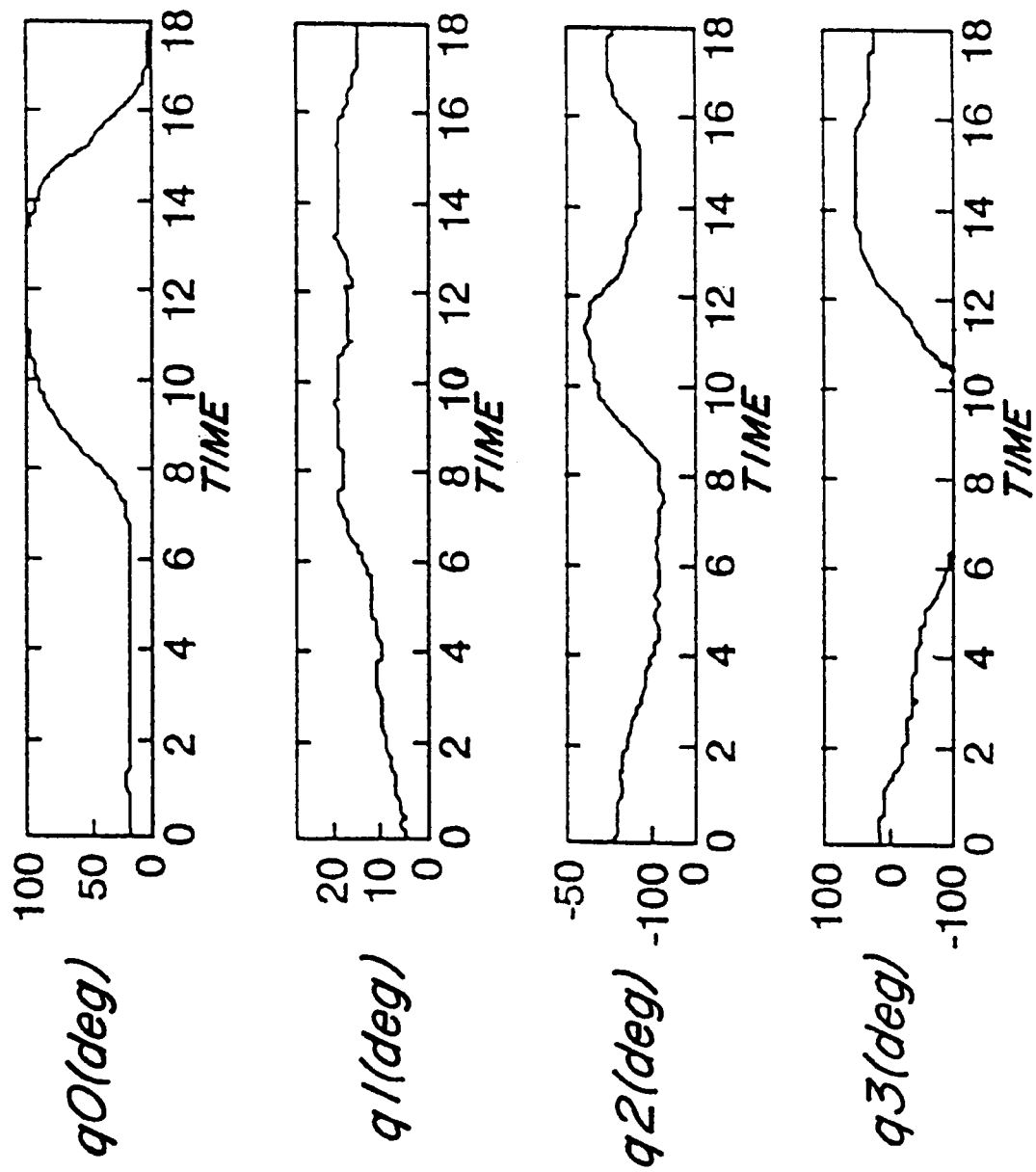
FIG. 5A is a graph of test results for an autonomous excavating machine as an embodiment of the present invention.
Figure 5B:
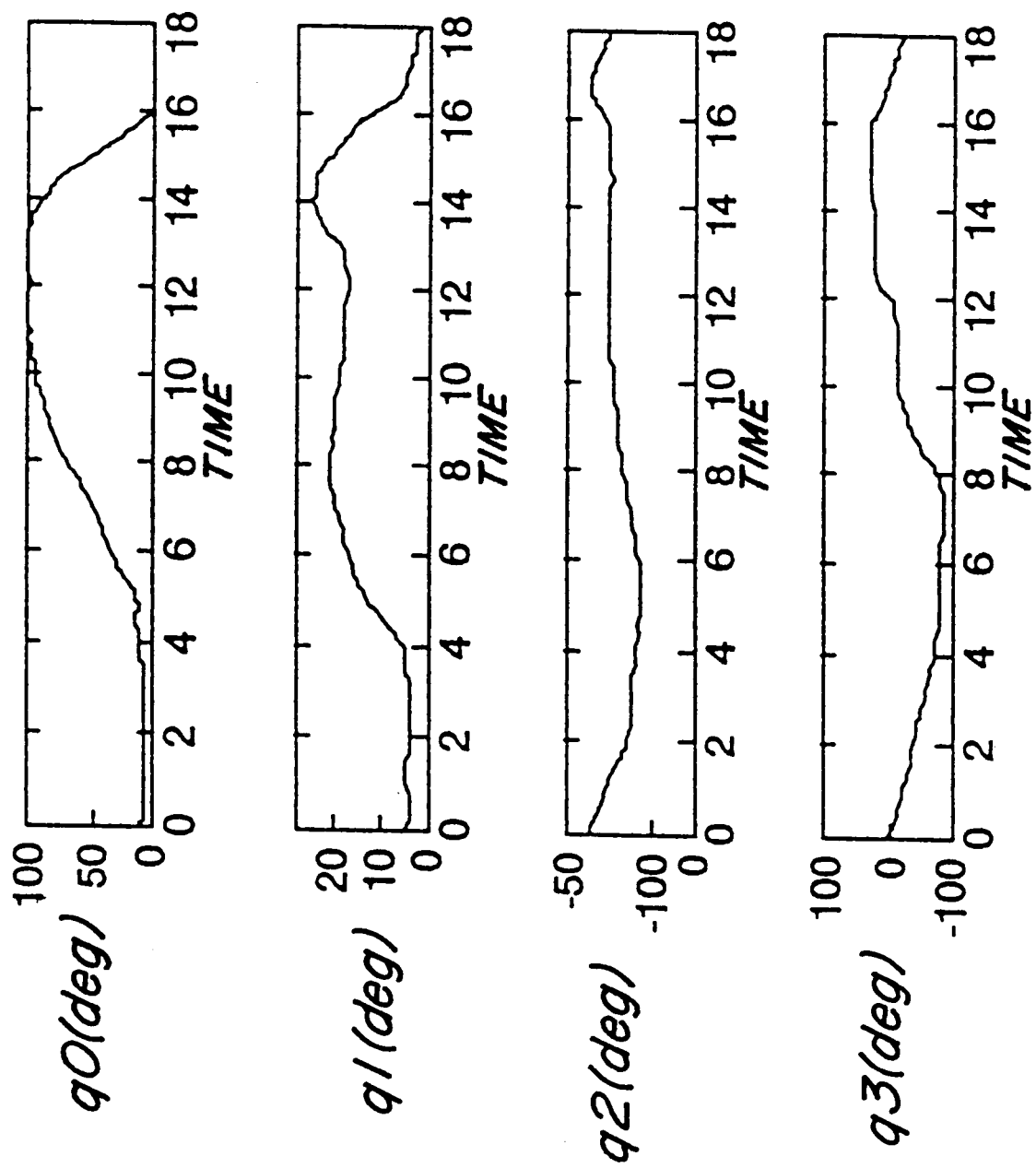
FIG. 5B is a graph of test results for an excavating machine operated by an expert human operator.

The performance of the script illustrated in FIGS. 4a through 4d is illustrated in FIG. 5A. The times obtained by a human expert excavator operator who loaded the truck at the test site are shown in FIG. 5B. Typical dig-dump cycle times to dig a bucket of soil, dump it into the truck and return to the soil face were between 15 to 16 seconds for the human operator. It was estimated that he could fully load the truck with 20 tons of dirt in approximately 2 minutes. The truck loading script consistently averaged 19 to 20 seconds for a dig-dump cycle. The digging algorithm dug slightly more soil than the human expert did in each cycle. Therefore, the throughput of the system, or how many tons of earth could be moved in a given time, equaled and sometimes exceeded that of the human expert operator.

Differences in the joint motions between FIGS. 5A and 5B are in part due to differences in the dig location, digging styles, soil conditions and location and orientation of the truck; however, it can be seen that in general the movements are very similar. In additional tests, the collision avoidance script was successful and little or no spillage of soil occurred, despite the higher loads in the bucket. Different truck loading positions were tried with similar results.

Parameterized scripts can be applied to many different types of complex motion control in robotic systems. Many complex tasks can be broken down into a series of simple steps. Use of parameters in general instructions is an effective way to handle small changes in operation. Coupling movements of joints via parameters having values representing external conditions, including the occurrences of events as the result of the movement of other joints, and internal factors, such as power limitations, simplifies generation of the instructions and provides flexibility and safety of operation.

The many features and advantages of the present invention are apparent from the detailed specification, and thus, it is intended by the appended claims to cover all such features and advantages of the system and method which fall within the true spirit and scope of the invention. Further, since numerous modifications and changes will readily occur to those skilled in the art from the disclosure of this invention, it is not desired to limit the invention to the exact construction and operation illustrated and described. Other suitable modifications and equivalents may be resorted to, as falling within the scope and spirit of the invention.

What is claimed is:

1. A method for controlling complex automated movement by a manipulator, the manipulator having a plurality of links connected at joints and at least one sensor providing perceptual information to software, the software being operable to monitor movement of the manipulator based on the perceptual information and to generate commands for controlling movement of the manipulator, the method comprising:

executing event based pre-stored instructions, including at least one parameter generally defining the complex automated movement, said pre-stored instructions including a primary script formed of concurrently executing scripts;

utilizing the software to determine a value for at least one parameter during the executing of the pre-stored instructions;

obtaining the value for the at least one parameter from any of a sensor input, a data file, and other software;

determining the order to execute the sets of instructions based on the values of the parameters; and wherein the at least one parameter includes at least one modeled parameter, and wherein the step of utilizing the software includes the steps of executing modeling software to model at least the manipulator during the executing of the pre-stored instructions and providing a value for each modeled parameter.

2. A method, as set forth in claim 1, wherein executing the pre-stored instructions includes the step of concurrently executing sets of instructions for movement of at least two of the links, with a movement of a first link starting during movement of a second link.

3. A method, as set forth in claim 2, wherein determining a value includes the step of obtaining first parameter values indicating when movement of the first link should start depending on an amount of movement of at least the second link.

4. A method, as set forth in claim 3, wherein determining a value includes the step of determining when movement of the first link should start based on when the second link moves a portion of a distance between starting and ending positions.

5. A method, as set forth in claim 4, wherein determining a value includes the step of obtaining second parameter values, different from the first parameter values, indicating when movement of the second link should start depending on an amount of movement of at least the first link.

6. A method, as set forth in claim 1, wherein determining a value includes the step of obtaining a first parameter value representing completion of a first portion of the complex automated movement, and wherein executing pre-stored instructions includes the step of using the first parameter value in controlling a second portion of the complex automated movement.

7. A method, as set forth in claim 6, wherein related mechanisms produce the first and second portions of the complex automated movement, and wherein the step of determining a value obtains the first parameter value by modeling the first and second portions of the complex automated movement.

8. A method, as set forth in claim 1, wherein the pre-stored instructions include at least one secondary script, and wherein determining a value includes the step of evaluating conditions to determine whether to execute the at least one secondary script to control a portion of the complex automated movement.

9. A method for controlling a mobile machine having at least one sensor providing perceptual information to software, the software being operable to monitor movement of the manipulator based on the perceptual information and to generate commands for controlling movement of the manipulator, the method comprising:

storing sets of event based instructions, each set generally defining movement of a corresponding portion of the mobile machine;

utilizing the software to determine values of parameters defining precise movement of the mobile machine;

determining the order to execute the sets of instructions based on the values of the parameters;

repeatedly executing the sets of instructions using the values of the parameters determined prior to each repetition, with at least two of the sets of instructions executed concurrently, and wherein the parameters include at least one modeled parameter, and wherein determining values includes the step of executing modeling software to model the mobile machine during the executing of the sets of instructions and to provide a value for each modeled parameter.

10. A method, as set forth in claim 9, wherein mechanisms produce the previous and subsequent movements, and wherein the step of determining values obtains a value of the first parameter by modeling the previous and subsequent movements.

11. A method, as set forth in claim 9, wherein the first parameter represents when the subsequent movement should start, and wherein determining values includes the step of obtaining a value of the first parameter based on a second parameter representing when a portion of the previous movement will be completed.

12. A method, as set forth in claim 9, including the step of storing results of modeling the mobile machine, and wherein determining values includes the step of reading the results of the modeling to obtain the values of at least one of the parameters.

13. A method, as set forth in claim 9, wherein the instructions include a primary script, incorporating several sets of the instructions, and at least one secondary script, wherein executing the sets of instructions includes the step of concurrently executing a series of sets of instructions to control a series of movements of the mobile machine, and wherein determining values includes the step of evaluating conditions to determine whether to execute the at least one secondary script to control the series of movements of the mobile machine.

14. A control system for a mobile machine, the mobile machine including a manipulator having a plurality of links and at least one sensor providing perceptual information to software, the software being operable to monitor movement of the manipulator based on the perceptual information and to generate commands for controlling movement of the manipulator comprising:

a storage unit to store sets of instructions, each set generally defining movement of at least one link and to provide memory locations for parameters defining precise movement of the mobile machine;

a processor executing the software, coupled to the storage unit, to determine values of the parameters and to concurrently execute the sets of instructions based on events, the sets of instructions being executed in an order determined by the software, the order being based at least partially on the values of the parameters, and wherein the storage unit further stores modeling information modeling movement of the mobile machine, and wherein the processor obtains at least one modeled parameter from the modeling information.

15. A control system, as set forth in claim 14, wherein the instructions stored by the storage unit and executed by the processor include at least one timing instruction for starting movement of a first link at a specified time determined by a timing parameter and a previously started movement of a second link.

16. A control system, as set forth in claim 14, wherein the storage unit further stores modeling information, and wherein the processor determines at least one of velocity and acceleration values for at least one parameter, based on at least one of the inputs from the sensors, direction of movement of at least one of the links, position of the manipulator, and the modeling information stored in the storage unit.

17. A mobile manipulator, comprising:

a mobile base;

a manipulator arm mounted on the mobile base and having a plurality of links;

at least one sensor providing perceptual information to software, the software beings operable to monitor movement of the manipulator based on the perceptual information and to generate commands for controlling movement of the manipulator; and a control system connected to at least the manipulator arm to execute event based pre-stored instructions generally defining automated movement of the mobile manipulator, and to determine values for parameters defining precise movement of the mobile manipulator during execution of the pre-stored instructions, the sets of instruction being executed in an order determined by the software, the order being based at least partially on the values of the parameters, wherein the control system comprises:

a storage unit to store the event based pre-stored instructions generally defining the movement of the mobile manipulator, and to provide memory locations for the parameters defining precise movement of the mobile manipulator; and a processor coupled to the storage unit and at least the manipulator arm to determine values of the parameters and to execute the pre-stored instructions.

18. A mobile manipulator, as set forth in claim 17, wherein the storage unit further stores modeling information modeling movement of the mobile manipulator, and wherein the processor obtains at least one modeled parameter from the modeling information.

19. A mobile manipulator, as set forth in claim 17, wherein the manipulator arm includes a boom, a stick, and a bucket, moved by corresponding hydraulic cylinders actuated by pumps and valves, and wherein the processor outputs commands to the valves to begin a first movement of the boom and the stick after a second movement of the boom and the stick, based on the values of the parameters.

20. A mobile manipulator, as set forth in claim 19, wherein the control system further comprises sensors coupled to the processor to measure movement of the mobile manipulator, detect conditions surrounding the mobile manipulator, and provide inputs used to determine the parameters.

21. A mobile manipulator, as set forth in claim 17, wherein the pre-stored instructions stored in the storage unit include a primary script and at least one secondary script, and wherein the processor executes the primary script to control a plurality of movements of the mobile manipulator, and evaluates conditions to determine whether to execute the at least one secondary script to control a series of movements of the mobile manipulator."

* * * * *